United States Patent
Baugh

(10) Patent No.: US 9,664,207 B2
(45) Date of Patent: May 30, 2017

(54) GAS HANDLING METHOD FOR DUAL BOTTLE SUBSEA ACCUMULATORS

(71) Applicant: Reel Power Licensing Corp., Oklahoma City, OK (US)

(72) Inventor: Benton Frederick Baugh, Houston, TX (US)

(73) Assignee: Reel Power Licensing Corp., Oklahoma City, OK (US)

(*) Notice: Subject to any disclaimer, the term of this patent is extended or adjusted under 35 U.S.C. 154(b) by 588 days.

(21) Appl. No.: 14/274,094

(22) Filed: May 9, 2014

(65) Prior Publication Data

US 2015/0322972 A1    Nov. 12, 2015

(51) Int. Cl.
| | | |
|---|---|---|
| F15B 3/00 | (2006.01) | |
| F15B 1/08 | (2006.01) | |
| F15B 1/24 | (2006.01) | |
| E21B 33/035 | (2006.01) | |
| F15B 21/00 | (2006.01) | |

(52) U.S. Cl.
CPC ............ *F15B 3/00* (2013.01); *E21B 33/0355* (2013.01); *F15B 1/08* (2013.01); *F15B 1/24* (2013.01); *F15B 21/006* (2013.01); *F15B 2201/205* (2013.01); *F15B 2201/31* (2013.01); *F15B 2201/32* (2013.01); *F15B 2201/4155* (2013.01); *Y02E 60/15* (2013.01)

(58) Field of Classification Search
CPC ................ F15B 1/04; E21B 19/006
USPC ....................................... 29/402.01
See application file for complete search history.

(56) References Cited

U.S. PATENT DOCUMENTS

| | | | |
|---|---|---|---|
| 6,202,753 B1 | 3/2001 | Baugh | |
| 6,834,680 B2* | 12/2004 | Baugh | E21B 33/0355 138/30 |
| 8,479,774 B2 | 7/2013 | Baugh | |
| 9,488,198 B2* | 11/2016 | Groben | E21B 33/064 |

* cited by examiner

*Primary Examiner* — Jason L Vaughan
*Assistant Examiner* — Amanda Meneghini
(74) *Attorney, Agent, or Firm* — Phillips Murrah PC; Martin G. Ozinga

(57) ABSTRACT

The method of safely handling compressed gas in a dual bottle subsea accumulator during service operations comprising providing a gas bottle for the primary purpose of storing gas which will be compressed to provide accumulated energy, providing a hydraulic bottle with the primary purpose of converting the energy stored in the gas bottle into pressurized hydraulic supply fluid, providing interconnecting plates at the top and bottom of the gas bottle and the hydraulic bottle with porting to communicate the gas from the gas bottle to the hydraulic bottle, providing a first closure valve in a protected position within the top of the gas bottle, providing a second closure valve in a protected position within the bottom of the gas bottle, expelling a majority of the gas from the hydraulic bottle into the gas bottle, closing the first closure valve and the second closure valve, and removing the interconnecting plates from the gas bottle and the hydraulic bottle, and servicing the hydraulic bottle.

10 Claims, 4 Drawing Sheets

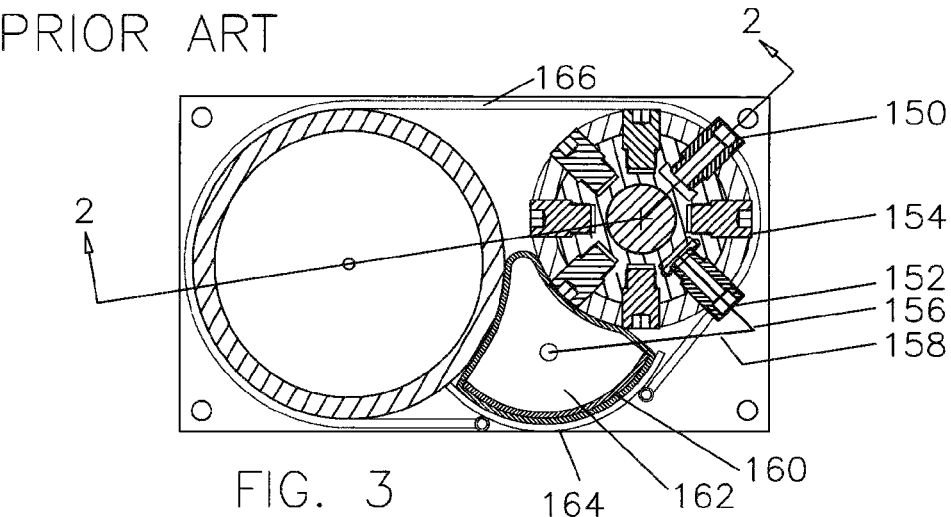
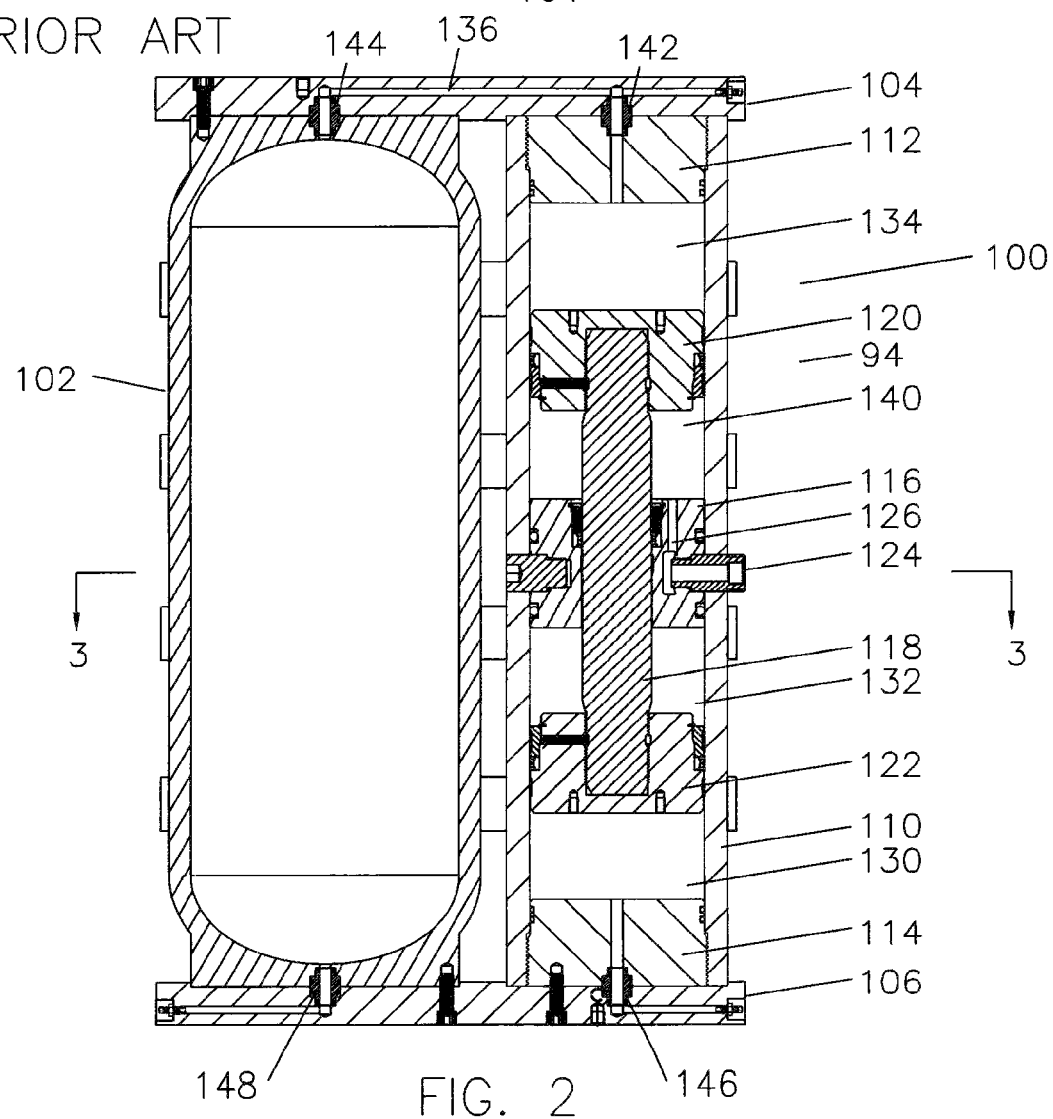
PRIOR ART
FIG. 3
PRIOR ART
FIG. 2

GAS HANDLING METHOD FOR DUAL BOTTLE SUBSEA ACCUMULATORS

TECHNICAL FIELD

This invention relates to the method of safely storing the compressed gas of a dual bottle subsea accumulator within the gas bottle when the hydraulic bottle must be removed for servicing.

BACKGROUND OF THE INVENTION

This invention relates to the method of safely storing the compressed gas of a dual bottle subsea accumulator within the gas bottle when the hydraulic bottle must be removed for servicing.

The field of this invention is providing accumulated power for operating blowout preventers in deep water operations to seal the well bore and protect the environment in emergency situations when an obstruction is in the well bore.

Many accumulators are of a single bottle type which separates compressed gas from the hydraulic working fluid by a single boundary. The boundary can be a rubber bladder much like a balloon or a floating steel piston. The advantage of this design is simplicity in that the pressure with the hydraulic fluid is exactly the same as the pressure within the compressed gas. There are various disadvantages of this solution in the subsea environment such as requiring high gas pressures and the need to adjust the gas pressure for surface testing and actual subsea operations.

Depth compensated accumulators such as are described in U.S. Pat. No. 6,202,753 FIG. 3 provide the advantages of lower gas pressures and automatic adjustment for the environmental pressures, however, are more complex in design. As shown in U.S. Pat. No. 6,202,753 FIG. 3, the accumulator is of a single bottle design. However, in practice, the upper gas portion of the bottle is more economically manufactured as a separate gas bottle and the lower piston areas manufactured in a hydraulic bottle—a dual bottle accumulator.

An advantage of the dual bottle accumulator is that it makes the critical tolerance and active part of the accumulator smaller and easier to service. When this servicing is to be done, all the compressed gas within the gas bottle must be vented to the atmosphere and lost. After servicing, fresh nitrogen must be supplied and recompressed up to the storage pressures, i.e. 4500 p.s.i. In an offshore installation, the amount of gas required for pressurizing these large accumulators requires that a large expensive nitrogen manufacturing plant be installed on the rig.

BRIEF SUMMARY OF THE INVENTION

The object of this invention is to provide a method of trapping the stored gas within the gas bottle during service operations so that the stored gas and energy are not lost.

A second object of this invention is to provide a method of providing valving within the gas bottle such that during the handling of the gas bottles the valving and the actuators for the valving are not put at risk.

A third object of this invention is to provide a method of expelling the greater majority of the gas from the hydraulic bottle into the gas bottle before trapping the gas within the gas bottle to maximize the safety of the disassembly operations and minimize the loss of gas.

A fourth object of the invention is to reduce the loss of gas during service operations to the point that they can be "topped off" from a supply bottle rather than requiring a nitrogen gas manufacturing plant.

BRIEF DESCRIPTION OF THE DRAWINGS

FIG. 2 is a half section of a prior art double bottle accumulator taken along the lines "2-2" of FIG. 3.

FIG. 3 is a half section of a prior art double bottle accumulator taken along lines "3-3" of FIG. 2, and is also a half section of the accumulator of this invention.

DETAILED DESCRIPTION OF THE DRAWINGS

Figure 1:
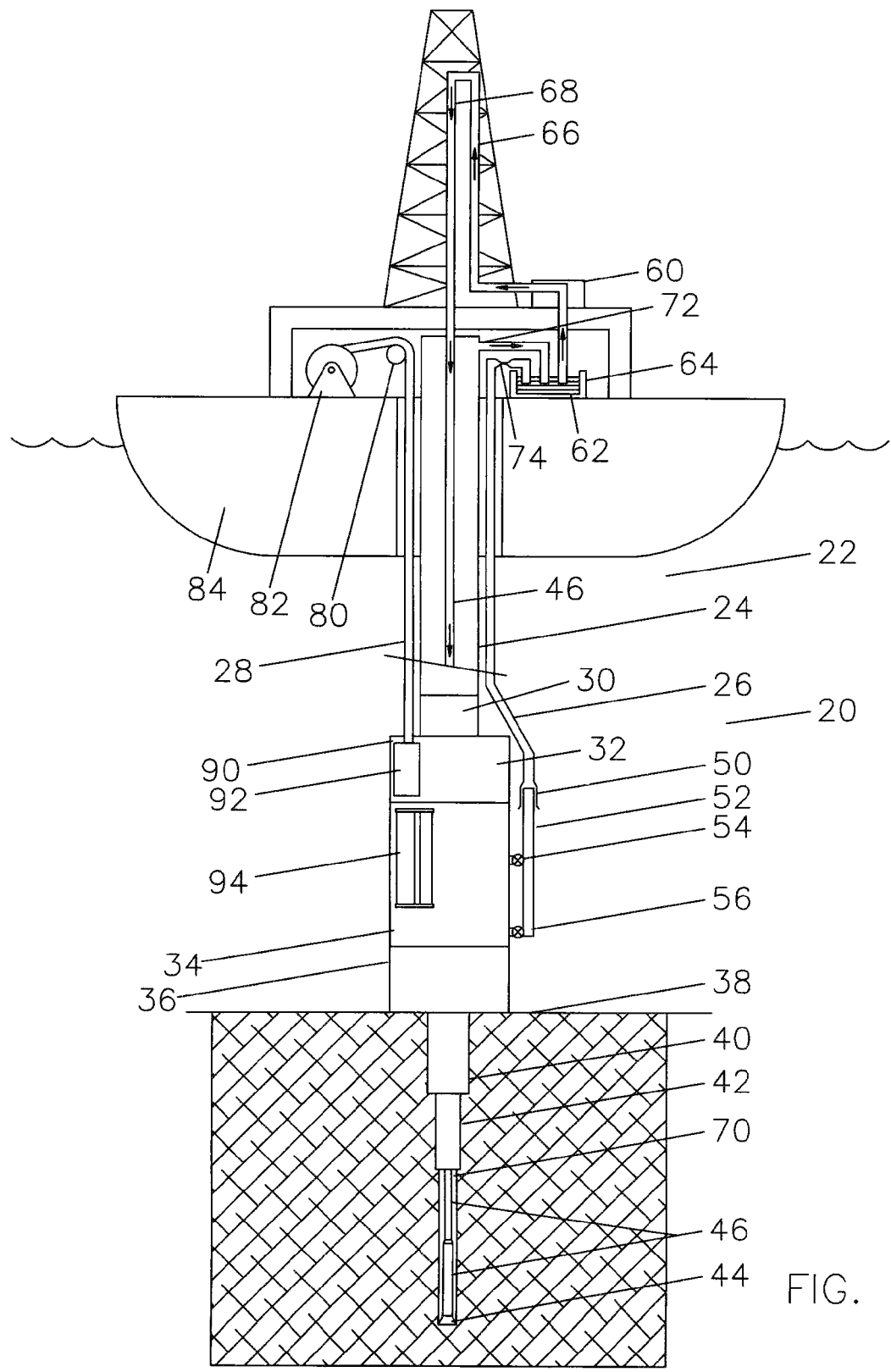
FIG. 1 is a view of a system of subsea equipment utilizing an accumulator of this method.

Referring now to FIG. 1, a view of a complete system for drilling subsea wells 20 is shown in order to illustrate the utility of the present invention. The drilling riser 22 is shown with a central pipe 24, outside fluid lines 26, and cables or hoses 28.

Below the drilling riser 22 is a flex joint 30, lower marine riser package 32, lower blowout preventer stack 34 and wellhead 36 landed on the seafloor 38.

Below the wellhead 36, it can be seen that a hole was drilled for a first casing string 40, that first casing string 40 was landed and cemented in place, a hole drilled through the first string for a second string, the second string 42 cemented in place, and a hole is being drilled for a third casing string by drill bit 44 on drill string 46.

The lower blowout preventer stack 34 generally comprises a lower hydraulic connector for connecting to the subsea wellhead system 36, usually 4 or 5 ram style Blowout Preventers, an annular preventer, and an upper mandrel for connection by the connector on the lower marine riser package 32, which are not individually shown but are well known in the art.

Below outside fluid line 26 is a choke and kill (C&K) connector 50 and a pipe 52 which is generally illustrative of a choke or kill line. Pipe 52 goes down to valves 54 and 56 which provide flow to or from the central bore of the blowout preventer stack as may be appropriate from time to time. Typically a kill line will enter the bore of the Blowout Preventers below the lowest ram and has the general function of pumping heavy fluid to the well to overburden the pressure in the bore or to "kill" the pressure. The general implication of this is that the heavier mud cannot be circulated into the well bore, but rather must be forced into the formations. A choke line will typically enter the well bore above the lowest ram and is generally intended to allow circulation in order to circulate heavier mud into the well to regain pressure control of the well. Normal circulation is down the drill string 46, through the drill bit 44.

In normal drilling circulation the mud pumps 60 take drilling mud 62 from tank 64. The drilling mud will be pumped up a standpipe 66 and down the upper end 68 of the drill string 46. It will be pumped down the drill string 46, out the drill bit 44, and return up the annular area 70 between the outside of the drill string 46 and the bore of the hole being drilled, up the bore of the casing 42, through the subsea wellhead system 36, the lower blowout preventer stack 34, the lower marine riser package 32, up the drilling riser 22, out a bell nipple 72 and back into the mud tank 64.

During situations in which an abnormally high pressure from the formation has entered the well bore, the thin walled central pipe 24 is typically not able to withstand the pressures involved. Rather than making the wall thickness of the relatively large bore drilling riser thick enough to withstand the pressure, the flow is diverted to a choke line or outside fluid line 26. It is more economical to have a relatively thick wall in a small pipe to withstand the higher pressures than to have the proportionately thick wall in the larger riser pipe.

When higher pressures are to be contained, one of the annular or ram Blowout Preventers are closed around the drill pipe and the flow coming up the annular area around the drill pipe is diverted out through choke valve 54 into the pipe 52. The flow passes up through C&K connector 50, up pipe 26 which is attached to the outer diameter of the central pipe 24, through choking means illustrated at 74, and back into the mud tanks 64.

On the opposite side of the drilling riser 22 is shown a cable or hose 28 coming across a sheave 80 from a reel 82 on the vessel 84. The cable or hose 28 is shown characteristically entering the top 90 of the lower marine riser package. These cables typically carry hydraulic, electrical, multiplex electrical, or fiber optic signals. Typically there are at least two of these systems for redundancy, which are characteristically painted yellow and blue. As the cables or hoses 28 enter the top 90 of the lower marine riser package 32, they typically enter a control pod 92 to deliver their supply or signals. Hydraulic supply is delivered to one or more dual bottle accumulators 94 located on the lower marine riser package 32 or the lower Blowout Preventer stack 34 to store hydraulic fluid under pressure until needed. Historically the hydraulic supply fluid has been stored in what might be called single bottle accumulators, but have simply been referred to as accumulators. When these accumulators are made of a depth compensated type, a special need of polished bores exists to separate the pressurized nitrogen gas from the working fluid and to separate the compensating fluid from the working fluid. This makes it advantageous to put the bulk of the pressurized nitrogen gas in an economically rough bore tank and the working fluid to be placed in a highly polished bore separate tank or bottle. The simpler single bottle accumulators were made with the economically rough bore tank only, and achieved the gas/working fluid separation by a bladder or balloon in the tank.

Referring now to FIG. 2, a prior art dual bottle accumulator 94 is shown with a hydraulic bottle 100, a gas bottle 102, an upper mounting plate 104, and lower mounting plate 106. Hydraulic bottle 100 comprises a cylinder 110, an upper bulkhead 112, and lower bulkhead 114, a center bulkhead 116, a piston rod 118, an upper piston 120, a lower piston 122, and a multiplicity of pins 124 which fix center bulkhead 116 to cylinder 110. Porting 126 shows one of the pins 124 communicating with the chamber 140. Chamber 130 has atmospheric pressure or is functionally a vacuum, chamber 132 has seawater environmental pressure as will be discussed in FIG. 3, and chamber 134 has gas supply and pressure from gas bottle 102 via porting 136 within upper mounting plate 104. Chamber 140 has working fluid within which is pressurized as a function of the nitrogen pressure within chamber 134 and the environmental pressure within chamber 132. Effectively at any depth, the pressure within chamber is higher than the environmental pressure by the amount of the gas pressure.

In this configuration as seen in FIG. 2, all the active or sliding seal components are located within hydraulic bottle 100, and therefore the most likely section to need to be serviced is the hydraulic bottle 100. To service hydraulic bottle 100, all the gas within the top of hydraulic bottle 100 and within gas bottle 102 must be vented to the atmosphere. This venting and the resulting regeneration and compression of gas on reassembly is time consuming and expensive.

Upper mounting plate 104 engages hydraulic bottle 100 and gas bottle 102 with seal subs 142 and 144 respectively. Lower mounting plate 106 engages hydraulic bottle 100 and gas bottle 102 with seal subs 148 and 148 respectively.

As the gas pressure within gas bottle 102 and chamber 134 of hydraulic bottle 100 must be gone before upper mounting plate 104 and lower mounting plate 106 can be safely removed, the gas (likely nitrogen) within must simply be vented. After servicing and reassembly, the gas must be supplied again. This is an expensive and time consuming process.

Referring now to FIG. 3, a half section of the dual bottle accumulator taken along lines "3-3" of FIG. 2. The multiplicity of pins 124 are shown to include 2 types of pins, ported pins 150 and 152, and 6 other solid pins 154. Each of these 8 pins are mounted in shear to take the loading of the pressure differential against center bulkhead 116. Ported pin 150 is ported to the chamber 140 to receive and dispense the working fluid of the accumulator, as is seen in FIG. 2. Ported pin 152 is shown graphically with lines 156 and 158 to go to the top of bladder 160. Bladder 160 contains a liquid 162 which collapses as required to maintain environmental pressure at all depths. Liquid 162 travels along lines 158 and 156, through ported pin 152 and into chamber 132 through porting similar to porting 126, except in the opposite direction. Metal curve 164 retains bladder 160 in place, with multiplicity of bands 166 retaining curve 164 in place.

Figure 4:
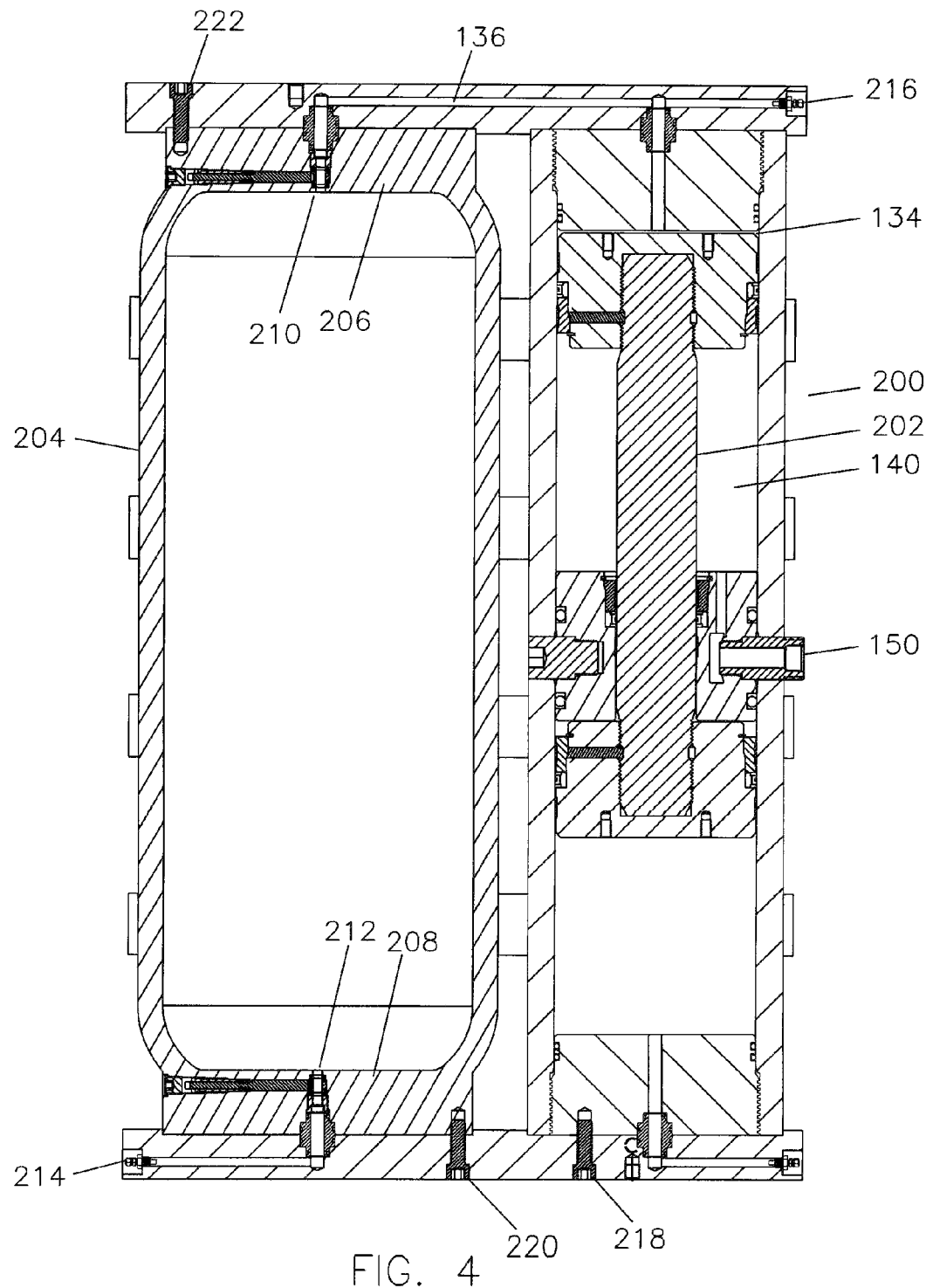
FIG. 4 is a half section of a double bottle accumulator of this invention.

Referring now to FIG. 4, a dual bottle accumulator 200 is shown with the improvements of the present invention. Piston assembly 202 is moved all the way to the top by filling chamber 140 with fluid through ported sub 150 to expel as much gas as possible from chamber 134 into gas bottle 204 through porting 136. Once the gas is primarily within gas bottle 204, valve 210 is provided within upper end 206 of gas bottle 204 and valve 212 is provided within the lower end 208 are provided to trap the gas within bottle 204. This means that a small residual of pressurized gas within chamber 134 and porting 136 can be vented through valves 210 and 212, allowing the disassembly to happen safely. As seen, extra metal is provided with upper and lower end of gas bottle 204 such that the valve 210 and valve 212 are completely protected from physical damage.

Figure 5:
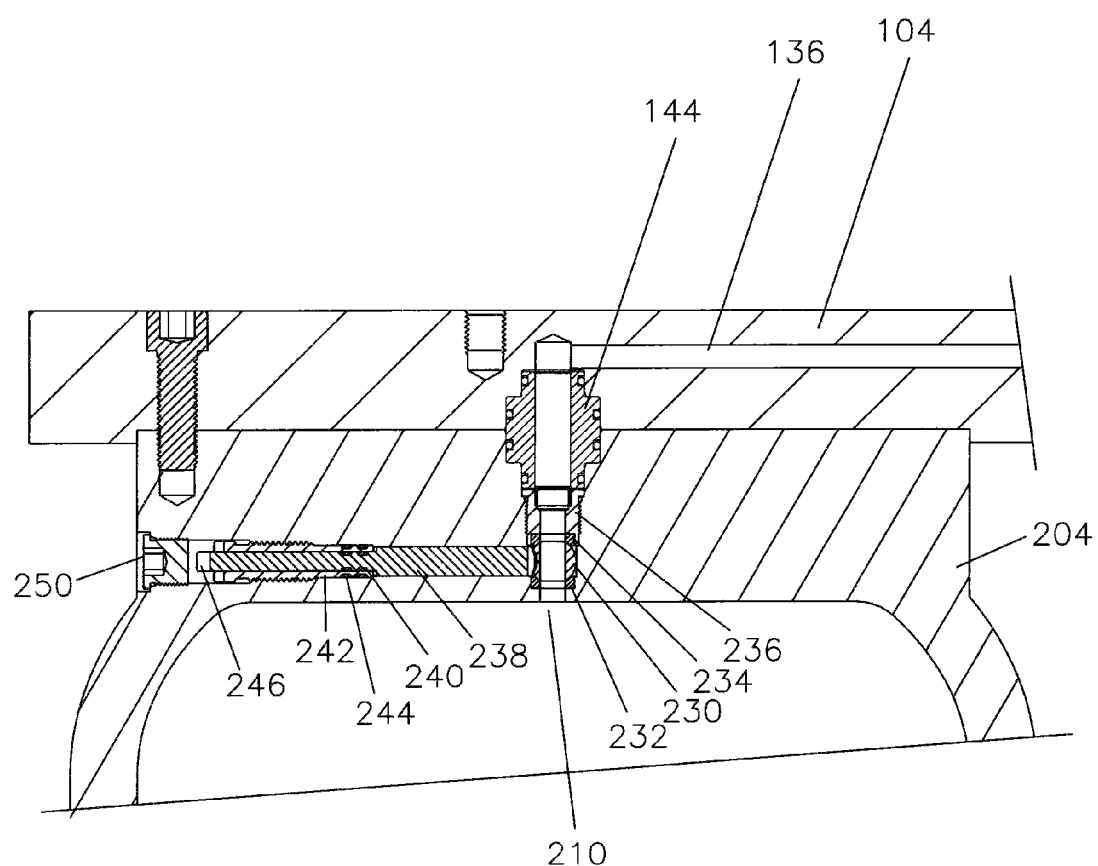
FIG. 5 is an enlarged half section of the upper portion of the gas bottle and upper mounting plate of the accumulator.

Referring now to FIG. 5, an upper portion of gas bottle 204 and an end portion of upper mounting plate 104 are shown. Valve 210 is shown to be a ball type valve with ball 230, seats 232 and 234, and retainer 236. The valve is operated by stem 238 which has stem seals 240, stem retainer 242, and stem retainer seals 244. Stem 238 has wrench flats 246 which allow the stem 238 to be rotated and also give an indication of the "open" or "closed" orientation of the valve ball 230. Sealing plug 250 provides for an independent redundant seal for stem seals 240 and stem retainer seals 244. This same pattern can be repeated in a mirror image fashion on the lower end of gas bottle 204. A port on the lower end will provide for more convenient charging and checking of the gas in the gas bottle in some circumstances.

The valves shown, 210 and 212 are illustrated as ball valves although other valve styles such as globe, plug, needle, and gate valves can be used. Ball valves are particularly convenient as they can have a full bore which matches the bore size of the associated piping and therefore not offer a flow restriction. Additionally, as ball valves are quarter turn in operation, it is easy to discern an open and closed position by looking at wrench flats on the end of the stem.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

That which is claimed is:

1. A method of safely handling compressed gas in a dual bottle subsea accumulator during service operations comprising:
   providing a gas bottle for the primary purpose of storing gas which will be compressed to provide accumulated energy,
   providing a hydraulic bottle with the primary purpose of converting the energy stored in said gas bottle into pressurized hydraulic supply fluid,
   providing interconnecting plates at a first end and a second end of said gas bottle and said hydraulic bottle with porting to communicate said gas from said gas bottle to said hydraulic bottle,
   providing a first closure valve in a protected position within said first end of said gas bottle,
   providing a second closure valve in a protected position within said second end of said gas bottle,
   expelling a majority of the gas from said hydraulic bottle into said gas bottle, closing said first closure valve and said second closure valve, and removing said interconnecting plates from said gas bottle and said hydraulic bottle, and servicing said hydraulic bottle.

2. The method of claim 1 further comprising said closure valves are ball valves.

3. The method of claim 2 further comprising said ball valves have a bore equal to the bore or greater than the size of the porting within said interconnecting plates.

4. The method of claim 1, further comprising moving one or more pistons within said hydraulic bottle to a position to expel the maximum amount of gas from said hydraulic bottle into said gas bottle prior to closing said first closure valve.

5. The method of claim 1, further comprising venting the compressed gas in said porting in said interconnecting plates prior to removing said interconnecting plates from said gas bottle.

6. A method of safely handling compressed gas in a dual bottle subsea accumulator during service operations comprising:
   providing a gas bottle for the primary purpose of storing gas which will be compressed to provide accumulated energy,
   providing a hydraulic bottle with the primary purpose of converting the energy stored in said gas bottle into pressurized hydraulic supply fluid,
   providing interconnecting plates at a top and a bottom of said gas bottle and said hydraulic bottle with porting to communicate said gas from said gas bottle to said hydraulic bottle,
   providing a first closure valve in a protected position within the top of said gas bottle,
   providing a second closure valve in a protected position within the bottom of said gas bottle,
   expelling a majority of the gas from said hydraulic bottle into said gas bottle, closing said first closure valve and said second closure valve, and removing said interconnecting plates from said gas bottle and said hydraulic bottle, and servicing said hydraulic bottle.

7. The method of claim 6 further comprising said closure valves are ball valves.

8. The method of claim 7 further comprising said ball valves have a bore equal to the bore or greater than the size of the porting within said interconnecting plates.

9. The method of claim 6, further comprising moving one or more pistons within said hydraulic bottle to a position to expel the maximum amount of gas from said hydraulic bottle into said gas bottle prior to closing said first closure valve.

10. The method of claim 6, further comprising venting the compressed gas in said porting in said interconnecting plates prior to removing said interconnecting plates from said gas bottle.

* * * * *